(12) United States Patent
Tressler et al.

(10) Patent No.: US 7,232,558 B2
(45) Date of Patent: Jun. 19, 2007

(54) ELECTRICALLY CONDUCTIVE FIBERS OF TI4O7 AND TI5O9

(75) Inventors: Richard E. Tressler, Boalsburg, PA (US); James H. Adair, State College, PA (US); David L. Shelleman, Phillpsburg, PA (US); Julie M. Anderson, State College, PA (US)

(73) Assignee: Advanced Power Devices, Inc., Washington, DC (US)

( * ) Notice: Subject to any disclaimer, the term of this patent is extended or adjusted under 35 U.S.C. 154(b) by 387 days.

(21) Appl. No.: 10/754,883

(22) Filed: Jan. 9, 2004

(65) Prior Publication Data

US 2005/0029715 A1 Feb. 10, 2005

Related U.S. Application Data

(60) Provisional application No. 60/439,377, filed on Jan. 10, 2003.

(51) Int. Cl.
*C01G 25/02* (2006.01)

(52) U.S. Cl. ............................ 423/608; 264/623
(58) Field of Classification Search .................. None
See application file for complete search history.

(56) References Cited

U.S. PATENT DOCUMENTS

| | | | | |
|---|---|---|---|---|
| 4,166,147 A | * | 8/1979 | Lange et al. | 428/328 |
| 5,733,489 A | * | 3/1998 | Hill | 264/125 |
| 6,395,080 B1 | * | 5/2002 | Cass et al. | 106/166.01 |

* cited by examiner

*Primary Examiner*—Colleen P. Cooke
*Assistant Examiner*—Paul Wartalowicz
(74) *Attorney, Agent, or Firm*—Law Offices of John A. Parrish

(57) ABSTRACT

Solid, shaped and fired fibers of $Ti_4O_7$ and $Ti_5O_9$ are made by firing $TiO_2$ fibers in a reducing atmosphere. In a first aspect, the $TiO_2$ fibers are made by extruding into air a viscous $TiO_2$ gel and heat treating the resulting green fibers to remove solvent, decompose and to volatilize undesired constituents to form electrically conductive, refractory fibers of $Ti_4O_7$ and $Ti_5O_9$. In a second aspect, solid, shaped and fired fibers of $Ti_4O_7$ and $Ti_5O_9$ are made by firing extruded fibers from mixtures of $TiO_2$.

72 Claims, 3 Drawing Sheets

FIG.2
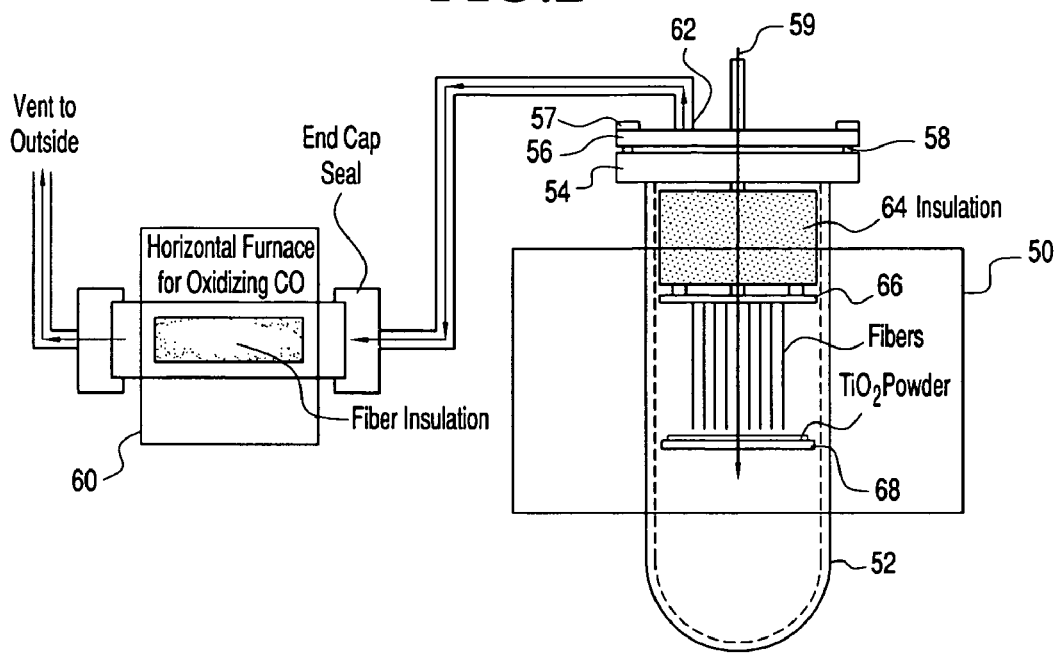
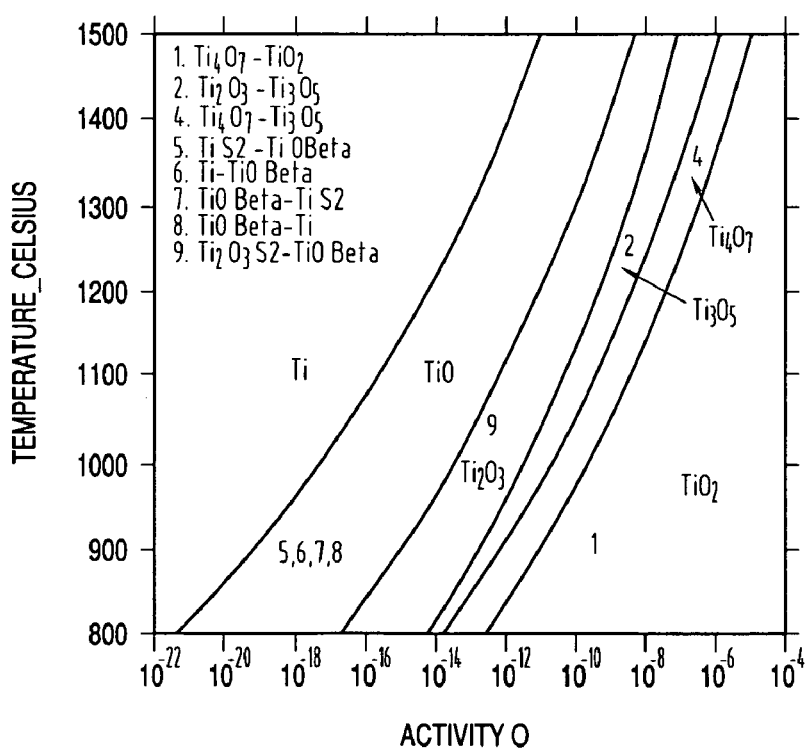
FIG.3

| Partial Pressure of Oxygen as a Function of Temperature and Corresponding Ratio of CO/CO$_2$ |||||| 
| Temperature (°C) | Temperature (K) | Activity of Oxygen | $P_{O_2}$ | $CO_2/CO$ | $CO/CO_2$ |
| --- | --- | --- | --- | --- | --- |
| 727 | 1000 | 4.98E-16 | 2.48E-31 | 8.18E-06 | 1.22E+05 |
| 747 | 1020 | 1.32E-15 | 1.74E-30 | 1.12E-05 | 8.96E+04 |
| 767 | 1040 | 3.37E-15 | 1.14E-29 | 1.50E-05 | 6.66E+04 |
| 787 | 1060 | 8.29E-15 | 6.87E-29 | 1.99E-05 | 5.02E+04 |
| 807 | 1080 | 1.97E-14 | 3.88E-28 | 2.62E-05 | 3.82E+04 |
| 827 | 1100 | 4.53E-14 | 2.05E-27 | 3.40E-05 | 2.94E+04 |
| 847 | 1120 | 1.01E-13 | 1.02E-26 | 4.36E-05 | 2.29E+04 |
| 867 | 1140 | 2.18E-13 | 4.77E-26 | 5.55E-05 | 1.80E+04 |
| 887 | 1160 | 4.60E-13 | 2.12E-25 | 7.00E-05 | 1.43E+04 |
| 907 | 1180 | 9.44E-13 | 8.90E-25 | 8.75E-05 | 1.14E+04 |
| 927 | 1200 | 1.89E-12 | 3.57E-24 | 1.08E-04 | 9.22E+03 |
| 947 | 1220 | 3.69E-12 | 1.36E-23 | 1.33E-04 | 7.49E+03 |
| 967 | 1240 | 7.05E-12 | 4.98E-23 | 1.63E-04 | 6.13E+03 |
| 987 | 1260 | 1.32E-11 | 1.74E-22 | 1.98E-04 | 5.06E+03 |
| 1007 | 1280 | 2.42E-11 | 5.86E-22 | 2.38E-04 | 4.20E+03 |
| 1027 | 1300 | 4.35E-11 | 1.90E-21 | 2.85E-04 | 3.50E+03 |
| 1047 | 1320 | 7.69E-11 | 5.91E-21 | 3.40E-04 | 2.94E+03 |
| 1067 | 1340 | 1.33E-10 | 1.78E-20 | 4.02E-04 | 2.49E+03 |
| 1087 | 1360 | 2.28E-10 | 5.19E-20 | 4.74E-04 | 2.11E+03 |
| 1107 | 1380 | 3.83E-10 | 1.46E-19 | 5.55E-04 | 1.80E+03 |
| 1127 | 1400 | 6.33E-10 | 4.01E-19 | 6.48E-04 | 1.54E+03 |
| 1147 | 1420 | 1.03E-09 | 1.07E-18 | 7.52E-04 | 1.33E+03 |
| 1167 | 1440 | 1.66E-09 | 2.76E-18 | 8.69E-04 | 1.15E+03 |
| 1187 | 1460 | 2.64E-09 | 6.95E-18 | 1.00E-03 | 9.99E+02 |
| 1207 | 1480 | 4.13E-09 | 1.71E-17 | 1.15E-03 | 8.71E+02 |
| 1227 | 1500 | 6.40E-09 | 4.09E-17 | 1.31E-03 | 7.62E+02 |
| 1247 | 1520 | 9.79E-09 | 9.59E-17 | 1.49E-03 | 6.70E+02 |
| 1267 | 1540 | 1.48E-08 | 2.20E-16 | 1.69E-03 | 5.90E+02 |
| 1287 | 1560 | 2.22E-08 | 4.93E-16 | 1.92E-03 | 5.22E+02 |
| 1307 | 1580 | 3.29E-08 | 1.08E-15 | 2.16E-03 | 4.62E+02 |
| 1327 | 1600 | 4.89E-08 | 2.39E-15 | 2.43E-03 | 4.11E+02 |
| 1347 | 1620 | 7.02E-08 | 4.93E-15 | 2.73E-03 | 3.67E+02 |
| 1367 | 1640 | 1.01E-07 | 1.02E-14 | 3.05E-03 | 3.28E+02 |
| 1387 | 1660 | 1.44E-07 | 2.09E-14 | 3.40E-03 | 2.94E+02 |
| 1407 | 1680 | 2.05E-07 | 4.19E-14 | 3.79E-03 | 2.64E+02 |
| 1427 | 1700 | 2.88E-07 | 8.27E-14 | 4.20E-03 | 2.38E+02 |
| 1447 | 1720 | 4.01E-07 | 1.61E-13 | 4.66E-03 | 2.15E+02 |
| 1467 | 1740 | 5.55E-07 | 3.08E-13 | 5.15E-03 | 1.94E+02 |
| 1487 | 1760 | 7.62E-07 | 5.81E-13 | 5.68E-03 | 1.76E+02 |
| 1507 | 1780 | 1.04E-06 | 1.08E-12 | 6.26E-03 | 1.60E+02 |
| 1527 | 1800 | 1.41E-06 | 1.99E-12 | 6.88E-03 | 1.45E+02 |

FIG.4

ELECTRICALLY CONDUCTIVE FIBERS OF TI4O7 AND TI5O9

This application claims priority to U.S. application Ser. No. 60/439,377 filed Jan. 10, 2003.

TECHNICAL FIELD

This invention relates to conductive fibers of refractory oxides, more particularly to conductive fibers of $Ti_4O_7$ and $Ti_5O_9$ and to their manufacture.

BACKGROUND ART

Conductive titanium suboxide(s) such as $Ti_4O_7$ and $Ti_5O_9$ are known. The manufacture of fibers which have consistent properties from these suboxides, however, is difficult. This is due, in part, to lack of reproducible oxygen stoichiometry in the suboxides.

There is great potential for improvements in battery performance through incorporation of conductive titanium suboxide fibers into the anodes and cathodes of a wide range of batteries, as well as into the grids of these batteries. The lack of reproducible stoichiometry in electrically conductive titanium suboxides, however, is a problem that has hindered realization of this potential.

A need therefore exists for conductive ceramic fibers and their manufacture, such as conductive titanium suboxide fibers, which have reproducible stoichiometry.

DISCLOSURE OF THE INVENTION

Solid, shaped and fired fibers of $Ti_4O_7$ and $Ti_5O_9$ are made by firing $TiO_2$ fibers in a reducing atmosphere. In a first aspect, the $TiO_2$ fibers are made by extruding into air a viscous $TiO_2$ gel and heat treating the resulting green fibers to remove solvent, decompose and to volatilize undesired constituents to form electrically conductive, refractory fibers of $Ti_4O_7$ and $Ti_5O_9$. In this aspect, conductive refractory fibers are made by reacting a source of titanium with an acid to produce a sol that includes Titania and a liquid. The liquid is evaporated to produce a Titania gel which is extruded to produce a green fiber that includes Titania. The green fiber is dried and then fired in a mixture of flowing reducing gases to produce a conductive, refractory fiber that include any of $Ti_4O_7$ and $Ti_5O_9$.

In a second aspect, solid, shaped and fired fibers of $Ti_4O_7$ and $Ti_5O_9$ are made by firing extruded fibers from mixtures of $TiO_2$. In this aspect, a mixture of Titania particles, organic binder, dispersant, and a liquid is extruded to produce a green fiber that includes Titania. The green fiber is dried, and then fired in a reducing atmosphere to produce a conductive, refractory fiber that includes any of $Ti_4O_7$ and $Ti_5O_9$. Useful mixtures include Titania, polyethylene imine, and distilled water where the ratio of Titania: polyethylene mine: water is about 40:1:19 and about 20:1:6.1.

BRIEF DESCRIPTION OF THE DRAWINGS

FIG. 2 shows a furnace setup for use in firing of ceramic fibers.

FIG. 3 shows stability fields for titanium oxides.

FIG. 4 shows oxygen partial pressures to produce $Ti_4O_7$.

MODES FOR CARRYING OUT THE INVENTION

Figures 1, 1A:
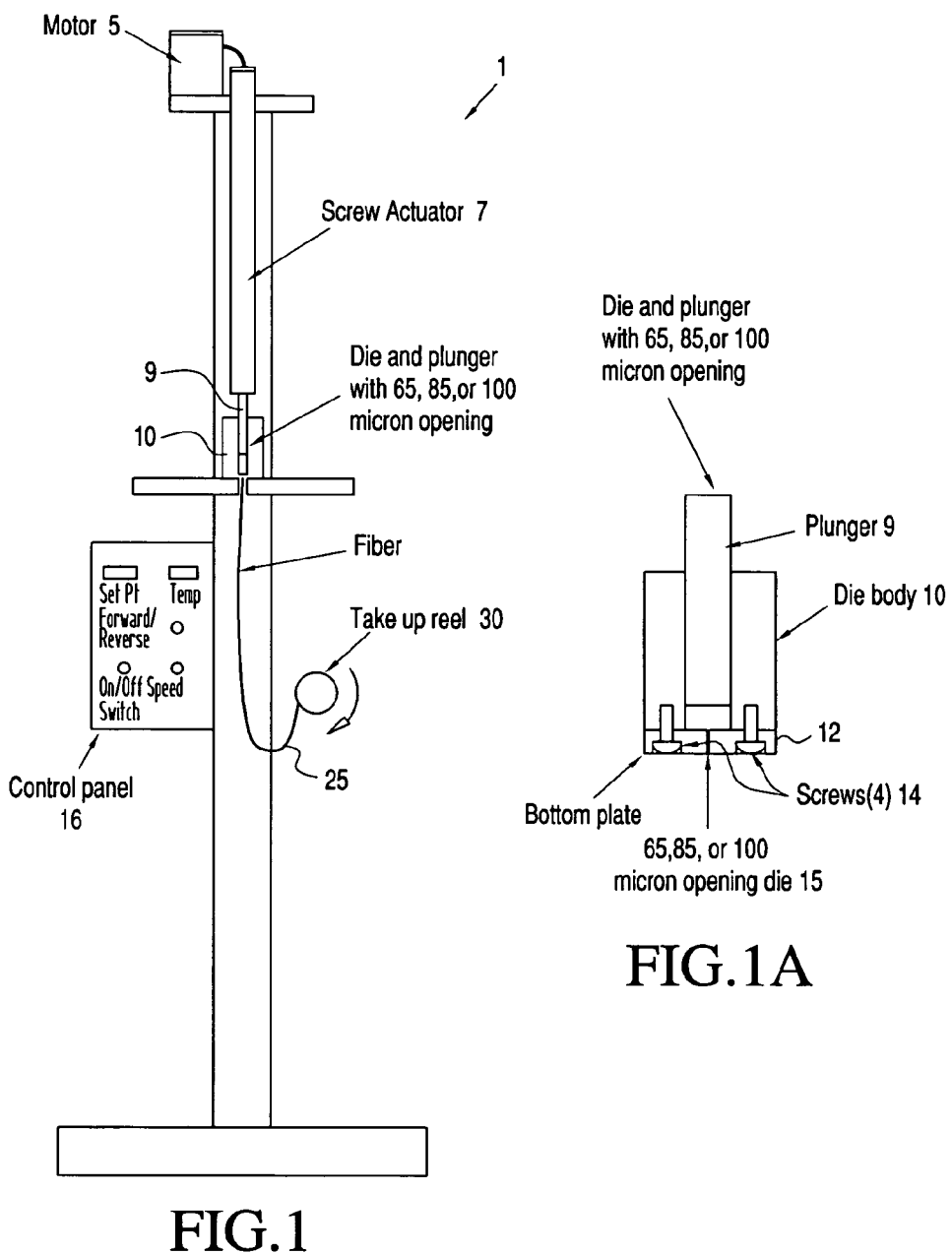
FIG. 1 is a schematic of an extruder for use in forming green ceramic fibers.
FIG. 1A is an enlarged view of a die body assembly for use in the extruder of FIG. 1

Electrically conductive titanium suboxide fibers are made by extruding green Titania fibers, and firing those fibers in a reducing atmosphere. In a first aspect of the invention, the green Titania fibers may be made from a Titania gel produced by the sol-gel process. In the sol-gel process, a source of titanium is added to an acid and reacted to make a Titania sol. Useful sources of titanium include but are not limited to titanium alkoxides such as titanium (IV) isopropoxide, and to titanium salts such as titanium acetylacetonates, titanium naphthalates, and titanium octylates. The purity of the titanium (IV) isopropoxide employed is about 97% or greater. Useful acids include but are not limited to hydrochloric acid, nitric acid, sulfuric acid, lactic acid, acetic acid, preferably hydrochloric acid. Where HCl is used, it preferably is cooled prior to addition of a titanium source to the acid. Typically, HCl is cooled to about 0° C. to about 10° C., preferably about 0° C. to about 5° C., most preferably about 0° C. The HCl typically has a molarity of about 11.97 to about 12.4 M. Where titanium (IV) isopropoxide is added to HCl, it is typical to add about 130 ml of titanium (IV) isopropoxide to about 22.75 ml HCl over a period of about 5 minutes to about 10 minutes. Where hydrochloric acid and Ti(IV) isopropoxide are used, the ratio of hydrochloric acid to Ti(IV)isopropoxide may vary from about 1:4.5 to about 1:5.5, preferably from about 1:1 to about 4:1, most preferably about 1:1 to about 5:1.

The Ti source used to manufacture the Titania sols may include one or more soluble or dispersible metal compounds as dopants to form doped Titania sols. The doped gels formed from the doped sols may be extruded and fired to produce doped, conductive fibers of $Ti_4O_7$ and $Ti_5O_9$. Metal dopants which may be employed include inorganic metal compounds such as nitrates of metals such as Yttrium, Niobium and Tantalum. Organic metal compounds which may be employed include metal alkoxides such as alkoxides of transition metals, alkaline metal compounds such as aluminum hydroxide, metal acetyl acetonates such as transition metal acetyl acetonates, naphthene acid metal salts such as transition metal napthalates, transition metal octylates and oxtyl acid metal salts of metals such as aluminum, silicon, zirconium, tantalum, magnesium, indium, tin, molybdenum, tungsten or germanium.

Transition metal alkoxides which may be employed include but are not limited to $Mn(OC_2H_5)_2$, $Mn(OC_3H_7)_2$, $Mn(OC_4H_9)_2$, $Ni(OC_2H_5)$, $Ni(OC_3H_2)$, $Ni(OC_4H_9)_2$, $Co(OC_2H_5)_2$, $Co(OC_3H_7)_2$, $Co(OC_4H_9)_2$, $Fe(OC_2H_5)_2$, $Fe(OC_3H_7)_2$, $Fe(OC_4H_9)_2$, $Cu(OC_2H_5)_2$, $Cu(OC_3H_7)_2$, $Cu(OC_4H_9)_2$, $VO(OCH_3)_3$, $VO(OC_2H_5)_3$, $VO(OC_3H_7)_3$, $VO(OC_4H_9)_3$ and $Y(OC_4H_9)_3$.

Transition metal acetylacetonates which may be employed include but are not limited to $Cu(C_5H_7O_2)_2$, $Co(C_5H_7C)_2)_2$, $(H_2O)_2$, $Co(C_5H_7O_2)_3$, $Ni(C_5H_7O_2)_2(H_2O)_2$, $Mn(C_5H_7O_2)_2)_2$ $(H_2O)_2$, $Cr(C_5H_7O_2)_3$, $VO(C_5H_7O_2)_2$, $Fe(C_5H_7O_2)_3$, $La(C_5H_7O_2)_3$, $Y(C_5H_7O_2)_3$, and $Zr(C_5H_7O_2)_4$.

Transition metal octylates which may be employed include but are not limited to $Cu(C_7H_{15}COO)_2$, $Ni(C_7H_{15}COO)_2$, $Fe(C_7H_{15}COO)$ $Mn(C_7H_{15}COO)_2$, $Co(C_7H_5COO)_2$, $Zr(C_7H_5COO)_2$, $Y(C_7H_{15}COO)$ and $La(C_7H_{15}COO)_2$.

Transition metal napthalates which may be employed include cobalt naphthenate, copper naphthenate, manganese naphthenate, iron naphthenate, nickel naphthenate, vanadium naphthenate, yttrium naphthenate and lanthanum naphthenate.

The liquid component of the sol is evaporated to produce a Titania gel. During evaporation, a rotary evaporator such as a Yamota RE51 rotary evaporator may be used. The evaporator operates over a range of flask heating temperatures, RPM settings, condensor cooling water temperatures and vacuum pressures. Typically, the bath temperature of the evaporator is about 30 to 50° C., preferably 35 to 45° C., most preferably 40° C. Generally, the bath temperature is sufficient to heat the solution to a temperature sufficient to drive off the solvent and form a gel structure. The RPM range of the evaporator typically is about 65 to 105 RPM, preferably 75 to 95 RPM, most preferably 85 RPM. Generally, the RPM is sufficient to rotate the flask so as to keep the solution in constant contact with the bath and to keep the solution well dispersed. The temperature of the cooling water used to cool the condensor tube of the evaporator typically is about 5 to 15° C., preferably about 7 to 12° C., most preferably about 10° C. Generally, the cooling water is sufficiently cold to enable the condensor tube to chill vapor from the heated solution into a liquid for receipt into the receiving flask of the evaporator. The vacuum pressure employed in the evaporator typically is up to about 20 psi, preferably about 16 to 20 psi, most preferably about 18 psi. Generally, the vacuum pressure employed is sufficient to evaporate the solvent at low temperatures.

The Titania containing gel is extruded to form a green fiber. The gel preferably is first extruded at a relatively high rate until the tip of the fiber exits the die. Typically, the rate used during initial extrusion is about 2 to about 10 times higher than the continuous extrusion speed, preferably about five times higher than the continuous extrusion speed. The extruded green fiber then is dried to remove volatiles and then is sintered in a reducing atmosphere to produce an electrically conductive, titanium suboxide fiber, preferably $Ti_4O_7$.

In a second aspect, green Titania fibers also may be formed by extrusion of a mixture of Titania particles. In this aspect, the Titania particles are mixed with an organic binder, a dispersant, and a liquid to form a mixture. The mixture then is milled to reduce the particle size of the Titania starting material. The milled mixture then is wet sieved and dried to form a mixture suitable for extrusion. The mixture, prior to extruding, typically is treated with a base such as tetraethylammonium hydroxide, ammonium hydroxide, sodium hydroxide and potassium hydroxide, preferably tetraethylammonium hydroxide and ammonium hydroxide, most preferably tetraethylammonium hydroxide to raise the pH of the mixture to about 4 to about 7, preferably to about pH 5.

Titania particles useful as starting materials include nano size Titania particles in the range of about 50 nm to about 300 nm. Titania particles with an average size of about 50 nm are available from Nanophase Technologies, Inc. Titania particles with an average size of about 200 nm to about 300 nm are available from DuPont Pigments. Titania particles sizes as large as about 320 micron also may be employed. Such particles are available from Atraverda. Useful liquids include but are not limited to distilled water and to alcohols such as isopropyl alcohol, ethanol, and methanol. Useful dispersants include cationic dispersants such as polyethylene imine ("PEI") and polyvinylpyrrolidone (PVP), preferably polyethylene imine. Useful anionic dispersants include ammonium polymethacrylate and polyacrylic acid, preferably ammonium polymethacrylate. Organic binders which may be employed include but are not limited to polyethylene imine, polyvinylalchol, polyvinylpyrrolidone, dibutyl phthalate and acrylics such as Latex acryloids.

The amounts of Titania particles which may be included in the mixture typically are about 35 to about 50 vol %, preferably about 45 to about 50 vol %, most preferably about 45 vol %, all amounts based on total volume of the mixture. Generally, the amount of milled Titania in the mixture is sufficient to extrude the mixture and to produce a green fiber. The amounts of organic binder which may be included in the mixture typically are about 3 wt. % to about 12 wt. %, preferably about 4 wt. % to about 7 wt. %, most preferably about 5 wt. %, all amounts based on the total weight of the mixture. Generally, the amount of organic binder in the mixture is sufficient to adequate green strength of the fiber during extrusion and drying. The amounts of dispersant which may be included in the mixture typically are about 3 wt. % to about 12 wt. %, preferably about 4 wt. % to about 7 wt. %, most preferably about 5 wt. %, all amounts based on the total weight of the mixture. Generally, the amount of dispersant in the mixture is sufficient to extrude the material and recover a suitable green fiber. The amounts of liquid which may be included in the mixture typically are about 50 to 65 vol. %, preferably about 50 to 60 vol. %, most preferably about 55 vol. %, all amounts based on the total volume of the mixture. Generally, the amount of liquid in the mixture is sufficient to extrude the material and recover a suitable green fiber.

Titania material such as Titania gel or Titania mixture may be extruded to produce green fiber. Useful extruders include the Marksman Extruder Fiber Drawing Machine from Chemat Technologies, Inc. extruder 1 as shown in FIGS. 1 and 1A. Extruder 1 includes motor 5 for powering screw actuator 7. Actuator 7 operates plunger 9 to extrude the Titania material contained in die body 10. Bottom plate 12 has a die opening and is secured to die body 10 by screws 14. Extruder 1 includes control panel 16 for control of motor 5 and other components of extruder 1. Die body optionally may be heated. The Titania material is extruded vertically downwardly through the die opening to form a green fiber.

Various dies may be employed in extruder 1. Useful dies 15 have a size of about 85 micron to about 200 microns diameter, preferably about 85 microns to about 100 microns diameter, most preferably about 85 microns diameter. The extrusion surface of die 15 typically is coated with a lubricant such as zinc stearate to minimize sticking of the extruded fiber to the surfaces of die 15.

The extruded green fiber passes over bottom roller 25 and then is directed upwardly and away from roller 25 for attachment to collection wheel 30. Wheel 30 is coated on its collection surface with a sacrificial film such as polyvinylchloride, cellulose, polyethylene, polyvinylchloride, Mylar, preferably polyvinylchloride. Upon attachment of the fiber to the wheel, the take-up speed of wheel 30 is adjusted to match the speed of continuous extrusion of the fiber.

The green fibers then are sintered such as in a tube type furnace 50 as in FIG. 2. Furnace 50 may optionally be operated with an oxidation furnace 60 such as that from CM Furnaces, Inc. Furnace 50 includes alumina tube 52 that is closed on one end. The opposite, open end of tube 52 is sealed with O-ring flange 54. Water cooled steel end cap 56 is joined to flange 54 by bolts 57. Rubber gasket 58 is included between flange 54 and end cap 56. Both flange 54 and end cap 56 have openings for receiving gas inlet member 59 and gas outlet member 62. Inlet member 59 may be an alumina tube. Outlet member 62 may be formed from alumina. Insulation member 64 is attached to inlet member 59. Upper and lower alumina disks 66 and 68, respectively, are joined to inlet member 59. Upper disk 66 functions as a hanger for vertically supporting the fibers during sintering. Lower disk 68 preferably includes $TiO_2$ powder on its surface.

Optional oxidation furnace 60 may be used to oxidize CO generated in furnace 50. In this aspect, CO from furnace 50 is ducted through outlet member 62 to furnace 60. In furnace 60, oxygen is mixed with the CO to generate $CO_2$. The $CO_2$ is vented to the atmosphere.

A four channel MKS mass flow controller 65 is used to control gas flow rates and the mixing of the reducing gases introduced to the furnace. The green Titania fibers may be fired horizontally or vertically, preferably vertically. The fibers are sintered in a reducing atmosphere in furnace 50 to convert the Titania fibers into electrically conductive fibers of titanium suboxides such as $Ti_4O_7$ and $TiO_9$.

A mixture of flowing, reducing gases is used to generate a reducing atmosphere in furnace 50. The reducing atmosphere employed during sintering of the Titania fiber is generated by using a mixture of 50% CO/50% $N_2$ and 1% $CO_2$/99% $N_2$. The oxygen partial pressure in the reducing atmosphere employed during sintering is calculated to achieve any of $Ti_4O_7$ and $Ti_5O_9$. The oxygen partial pressure is calculated by using the ThermoCalc computer program from Sundman et al, "The ThermoCalc Databank System", CALPHAD, VOL. 9, 1985, PP 153–190. Input parameters and data used in the ThermoCalc program are temperature and thermodynamic data for $Ti_4O_7$ and $Ti_5O_9$. This data can be found in the Scientific Group Thermodata Europe (SGTE) database published in Thermodynamic Properties of Inorganic Materials, Lehrstuhl fur Theoretische Huttenkunde, Ed. Landolt-Borernstejn New Series, Group IV, Springer Verlag, Berlin Heidelberg, 1999, vol. 19. These oxygen partial pressures are generated by the program as a function of temperature and the ratio of $CO:CO_2$ in the reducing atmosphere. The oxygen partial pressure in the reducing atmosphere and the selection of the reducing gases employed is such that the partial pressure of oxygen in the reducing atmosphere is within the stability fields of $Ti_4O_7$ and $Ti_5O_9$ shown in FIG. 3. To illustrate, calculated oxygen partial pressures generated by the ThermoCalc program to produce $Ti_4O_7$ are shown in FIG. 4. Useful mixtures of reducing gases include $CO/N_2$ and $CO_2/N_2$, preferably mixtures of 50% CO/50% $N_2$ and 1% CO/99% $N_2$. Mixtures of reducing gases may be supplied over a wide range of flow rates, typically about 100 SCCM to about 1000 SCCM. Typically, the fibers are heated at about 1° C./min. to about 10° C./min., preferably about 5° C./min. and fired at about 1050° C. to about 1300° C., preferably about 1087° C. The fibers are held at the firing temperature for about 8 hr. to about 16 hrs, preferably about 12 hrs. The fibers then are cooled at a rate of about 20° C./min. to about 50° C./min., preferably about 1° C./min. to about 10° C./min. to an intermediate temperature of about 600° C. to about 800° C. The furnace then is turned off and the fibers are cooled.

The sintered conductive fibers of titanium suboxides are evaluated for properties such as corrosion resistance, electrical conductivity, tensile strength, grain size, and phase composition. Corrosion resistance is measured by performing static corrosion tests on fiber mats in 30% $H_2SO_4$—$H_2O$ mixtures. The weight change of the fiber mat is measured by interrupting the corrosion tests at a fixed time interval, drying, and weighing the mat. At the end of the test, scanning electron microscopy is used to compare the surface character of the tested fibers to the surfaces of the as-fired fibers. Electrical conductivity is measured with a 4-point probe instrument for measurement of conductors in microelectronic circuits. Grain size of the sintered fibers is measured by scanning electron microscopy and phase composition is determined by X-ray diffraction.

The conductive fibers of $Ti_4O_7$ and $Ti_5O_9$ produced may be employed in electrical devices such as batteries. These fibers also may be fabricated into woven, felted, knitted, and other types of textiles and composites.

The invention will now be illustrated by reference to the following non-limiting examples.

EXAMPLE 1

Manufacture of $Ti_4O_7$ Fiber by Sintering of Titania Fibers Produced by the Sol-Gel Method 25 grams of 12 M HCl is placed into a one liter round bottom flask. The flask with the HCl is placed into an ice bath to chill the HCl to 0° C. Then, 125 gms of 98% pure titanium (IV) isopropoxide from Aldrige is added by a transfer pipette to the HCl while magnetic stirring over 10 minutes. The resulting solution is stirred for five minutes. The flask with the solution then is immediately placed on a Yamota RE51 rotary evaporator that has a bath temperature of 40° C., an RPM setting of 90, cooling water temperature of 10° C., and a vacuum pressure of 18 PSI.

The solution becomes highly viscous and opaque after 60 minutes on the evaporator. The RPM then is reduced to 40 RPM. After 30 minutes at 40 RPM, the flask with the resulting Titania gel is removed from the rotary evaporator and sealed. The Titania gel is stored overnight in the sealed flask at room temperature to remove entrapped air bubbles. The Titania gel then is extruded through extruder 1 to form green fibers.

The die employed in extruder 1 has an opening of 85–100 micron diameter. The die is coated with zinc stearate. The gel is extruded at the rate of 50 cm/sec into ambient air (20° C.) until the tip of the fiber exits the die. Thereafter, the extrusion speed is reduced to 10 cm/sec. for continuous extrusion. The green fiber is extruded vertically downwardly for a distance of one meter and then passed over a roller on the bottom of the extruder. The fiber, after it passes over the roller, is directed upwardly for attachment to a collection wheel that has an angular velocity that equals the continuous extrusion rate.

The dried fibers are sintered in vertical tube furnace 50. A mixture of reducing gases is passed through the vertical tube furnace for two hours at room temperature prior to sintering the green fibers to generate a reducing atmosphere that has an oxygen partial pressure of $10^{-20}$ atm.

The reducing atmosphere in the vertical tube furnace is generated by use of 200 SCCM of a mixture of 50% CO/50% $N_2$ and 1 sccm of a mixture of 1% CO/99% $N_2$ The fibers, while hanging vertically in the furnace, are heated in the reducing atmosphere at 10° C./min up to 1067° C. The fibers are held at 1067° C. for 12 hours and then cooled to room temperature at 20° C./minute. The resulting sintered fibers are conductive $Ti_4O_7$.

EXAMPLE 2

Manufacture of Sintered $Ti_4O_7$ Fiber from Green Fibers Formed from Titania Mixture Titania powder from Atraverda Corp. is employed as starting material. The Titania powder has an average particle size of 320 microns, a density of 4.3 gms/$cm^3$, and a BET surface area of 0.23 $m^2$/gm.

A mixture of 347.67 grams of the $TiO_2$ particles, 8.675 grams PEI, and 165.98 grams distilled water is attrition milled for 165 minutes to achieve a median Titania particle size of 2.3 micron with D(90%) at 4.8 micron and D(10%) at 0.8 micron. The pH of the mixture is adjusted with nitric acid during milling to lower the pH from 7.92 to 7.6.

The milled Titania mixture is wet sieved through a 425 mesh sieve. The sieved material is dried at 25° C. to produce a Titania mixture suitable for extrusion. The Titania mixture is placed into extruder 1 and extruded through a die opening of 80 micron diameter to form a green fiber. The fiber is extruded vertically downwardly and passed over a roller on the bottom of the extruder. The fiber then is directed upwardly for attachment to the upper surface of a collection wheel. The collection wheel has a take up speed that equals the continuous extrusion rate. The wheel is coated with polyvinylchloride on its collection surface. The collected, dried fibers are sintered under the conditions employed in example 1.

EXAMPLE 3

Manufacture of Sintered $Ti_4O_7$ Fiber from Green Fibers Formed from Titania Mixture Titania powder from DuPont (R101) is employed as starting material. The Titania powder has an average particle size of 50 nm, a density of 4.2 gms/cm$^3$, and a BET surface area of 6.8 m$^2$/gm. A mixture of 84 grams of the $TiO_2$ powder, 4.2 grams PEI, and 23.5 grams distilled water is formed. The pH of the slurry is adjusted to pH 2 with 1 M Nitric acid. After the Titania powder is mixed into the solution, the pH is raised to pH 7 using 1 M TEAOH. The resulting slurry is blended in a mixing cup, and then dried at 25° C. to produce a Titania mixture suitable for extrusion. Green fibers of the Titania mixture are formed, dried and fired as in example 2.

EXAMPLE 4

Manufacture of Sintered $Ti_4O_7$ Fiber from Green Fibers Formed from Titania Mixture Titania powder from DuPont (R101) is employed as starting material. The Titania powder has an average particle size of 50 nm, a density of 4.2 gms/cm$^3$, and a BET surface area of 6.8 m$^2$/gm. A mixture of 84 grams of the $TiO_2$ powder, 4.2 grams PEI, and 23.5 grams distilled water is formed. The pH of the slurry is adjusted to pH 2 with 1 M Nitric acid. After the Titania powder is mixed into the solution, the pH is raised to pH 5 using 1 M TEAOH. The resulting slurry is blended in a mixing cup, and then dried at 25° C. to produce a Titania mixture suitable for extrusion. Green fibers of the Titania mixture are formed and dried as in example 2. The dried fibers are fired in a 50% CO/50% N mixture of gases flowing at the rate of 100 sccm. The fibers are heated at 5° C./min to a sintering temperature of 1087° C. The fibers are held for 12 hours at 1087° C., and then cooled to 700 C at 10° C./min. followed by 5° C./min cooling to room temperature. The electrical conductivity is measured by 4-point probe and found to be 1890 (ohm-cm)$^{-1}$.

EXAMPLE 5

Manufacture of Sintered $Ti_4O_7$ Fiber from Green Fibers Formed from Titania Mixture The procedure of example 4 is followed except that the fibers are held for 17 hours at a sintering temperature of 1130° C.

The invention claimed is:

1. A method of manufacture of conductive refractory fibers comprising,
   reacting an amount of a source of titanium with an amount of an acid to produce a sol comprising Titania and a liquid component,
   evaporating the liquid component of the sol to produce a Titania gel
   extruding the gel to produce a green fiber comprising titania,
   drying the green fiber to produce a dried fiber comprising titania, and
   firing the dried fiber in a mixture of flowing reducing gases to produce a conductive, refractory fiber that comprises a titanium oxide compound selected from the group consisting of $Ti_4O_7$ and $Ti_5O_9$.

2. The method of claim 1 wherein the source of titanium is a titanium alkoxide.

3. The method of claim 2 wherein the titanium alkoxide is titanium (IV) isopropoxide.

4. The method of claim 1 wherein the source of titanium is a titanium salt selected from the group consisting of titanium acetylacetonates, titanium naphthalates, and titanium octylates.

5. The method of claim 3 wherein the titanium (IV) isopropoxide has a purity of about 97% or greater.

6. The method of claim 5 wherein the acid is selected from the group consisting of hydrochloric acid, nitric acid, sulfuric acid, lactic acid and acetic acid.

7. The method of claim 5 wherein the acid is hydrochloric acid.

8. The method of claim 7 wherein the hydrochloric acid has a temperature of about 0° C. to about 10° C.

9. The method of claim 7 wherein the hydrochloric acid has a temperature of about 0° C. to about 5° C.

10. The method of claim 7 wherein the hydrochloric acid has a temperature of about 0° C.

11. The method of claim 7 wherein the hydrochloric acid has a molarity of about 11.97 M to about 12.4 M.

12. The method of claim 3 wherein the acid is hydrochloric acid and wherein the amount of hydrochloric acid and the amount of Ti (IV) isopropoxide are present in a ratio of hydrochloric acid to Ti (IV) isopropoxide of about 1:4.5 to about 1:5.5.

13. The method of claim 3 wherein the acid is hydrochloric acid and wherein the amount of hydrochloric acid and the amount of Ti(IV)isopropoxide are present in a ratio of hydrochloric acid to Ti(IV)isopropoxide of about 1:1 to about 4:1.

14. The method of claim 3 wherein the acid is hydrochloric acid and wherein the amount of hydrochloric acid and the amount of Ti (IV) isopropoxide are present in a ratio of hydrochloric acid to Ti (IV) isopropoxide of about 1:1 to about 5:1.

15. The method of claim 1 wherein the titanium source includes a metal dopant.

16. The method of claim 15 wherein the metal dopant includes a metal selected from the group consisting of Yttrium, Niobium and Tantalum.

17. The method of claim 16 wherein the metal dopant is an inorganic metal compound selected from the group consisting of Yttrium nitrate, Niobium nitrate and Tantalum nitrate.

18. The method of claim 15 wherein the metal dopant is an organic metal compound selected from the group consisting of metal alkoxides, alkaline metal compounds, metal acetyl acetonates, naphthene acid metal salts, transition metal octylates and oxtyl acid metal salts.

19. The method of claim 15 wherein the metal dopant is a transition metal alkoxide.

20. The method of claim 15 wherein the metal dopant is an alkaline metal compound is aluminum hydroxide.

21. The method of claim 15 wherein the metal dopant is a transition metal acetylacetonate.

22. The method of claim 15 wherein the metal dopant is a transition metal napthalate.

23. The method of claim 15 wherein the metal dopant is a transition metal octylate.

24. The method of claim 15 wherein the metal dopant is a oxtyl acid metal salt of a metal selected from the group consisting of aluminum, silicon, zirconium, tantalum, magnesium, indium, tin, molybdenum, tungsten and germanium.

25. The method of claim 19 wherein the transition metal alkoxide is selected from the group consisting of $Mn(OC_2H_5)_2$, $Mn(OC_3H_7)_2$, $Mn(OC_4H_9)_2$, $Ni(OC_2H_5)$, $Ni(OC_3H_2$, $Ni(OC_4H_9)_2$, $Co(OC_2H_5)_2$, $Co(OC_3H_7)_2$, $Co(OC_4H_9)_2$, $Fe(OC_2H_5)_2$, $Fe(OC_3H_7)_2$, $Fe(OC_4H_9)_2$, $Cu(OC_2H_5)_2$, $Cu(OC_3H_7)_2$, $Cu(OC_4H_9)_2$, $VO(OCH_3)_3$, $VO(OC_2H_5)_3$, $VO(OC_3H_7)_3$, $VO(OC_4H_9)_3$ and $Y(OC_4H_9)_3$.

26. The method of claim 21 wherein the transition metal acetylacetonate is selected from the group consisting of $Cu(C_5H_7O_2)_2$, $Co(C_5H_7O_2)_2$, $(H_2O)_2$, $Co(C_5H_7O_2)_3$, $Ni(C_5H_7O_2)_2$ $(H_2O)_2$, $Mn(C_5H_7O_2)_2$ $(H_2O)_2$, $Cr(C_5H_7O_2)_3$, $VO(C_5H_7O_2)_2$, $Fe(C_5H_7O_2)_3$, $La(C_5H_7O_2)_3$, $Y(C_5H_7O_2)_3$, and $Zr(C_5H_7O_2)_4$.

27. The method of claim 23 wherein the transition metal octylates is selected from the group consisting of $Cu(C_7H_{15}COO)_2$, $Ni(C_7H_{15}COO)_2$, $Fe(C_7H_{15}COO)$ $Mn(C_7H_{15}COO)_2$, $Co(C_7H_5COO)_2$, $Zr(C_7H_5COO)_2$, $Y(C_7H_{15}COO)$ and $La(C_7H_{15}COO)_2$.

28. The method of claim 18 wherein the naphthene acid metal salt is a transition metal napthalate selected from the group consisting of cobalt naphthenate, copper naphthenate, manganese naphthenate, iron naphthenate, nickel naphthenate, vanadium naphthenate, yttrium naphthenate and lanthanum naphthenate.

29. The method of claim 1 wherein the liquid component is evaporated by using a rotary evaporator.

30. The method of claim 1 wherein the extruding comprises an initial extruding at a first rate and a continuous extrusion at a second rate, wherein the first rate is about 2 to about 10 times greater than the rate of continuous extrusion.

31. The method of claim 1 wherein the extruding comprises an initial extruding at a first rate and a continuous extrusion at a second rate, wherein the first rate is about 5 times greater than the rate of continuous extrusion.

32. A method of manufacture of conductive refractory fibers comprising,
    extruding the gel to produce a green fiber comprising titania,
    drying the green fiber to produce a dried fiber comprising titania, and
    firing the dried fiber in a mixture of flowing reducing gases to produce a conductive, refractory fiber that comprises a titanium oxide compound selected from the group consisting of $Ti_4O_7$ and $Ti_5O_9$.

33. A method of manufacture of conductive refractory fibers comprising,
    forming a mixture comprising titania particles, organic binder, dispersant, and a liquid,
    extruding the mixture to produce a green fiber comprising titania,
    drying the green fiber to produce a dried fiber comprising titania, and
    firing the dried fiber in a reducing atmosphere to produce a conductive, refractory fiber,
    wherein the conductive, refractory fiber comprises a titanium oxide compound selected from the group consisting of $Ti_4O_7$ and $Ti_5O_9$.

34. The method of claim 33 wherein the mixture, prior to extrusion into a green fiber, is treated with a base selected from the group consisting of tetraethylammonium hydroxide, ammonium hydroxide, sodium hydroxide and potassium hydroxide.

35. The method of claim 33 wherein the mixture, prior to extrusion into a green fiber, is treated with a base selected from the group consisting of tetraethylammonium hydroxide and ammonium hydroxide.

36. The method of claim 33 wherein the mixture, prior to extrusion into a green fiber, is treated with tetraethylammonium hydroxide to achieve a the of the mixture to about pH 5.

37. The method of claim 33 wherein the titania particles have an average particle size of about 50 nm to about 320 nm.

38. The method of claim 33 wherein the liquid is selected from the group consisting of distilled water and alcohol.

39. The method of claim 33 wherein the liquid is alcohol is selected from the group consisting of isopropyl alcohol, ethanol and methanol.

40. The method of claim 33 wherein the dispersant is selected from the group consisting of polyethylene imine, polyvinylpyrrolidone, ammonium polymethacrylate and polyacrylic acid.

41. The method of claim 33 wherein the organic binder is selected from the group consisting of polyvinylalchol, polyvinylpyrrolidone, dibutyl phthalate and latex acryloids.

42. The method of claim 33 wherein the Titania particles are present in the mixture in an amount of about 35 vol % to about 50 vol % based on total volume of the mixture.

43. The method of claim 33 wherein the Titania particles are present in the mixture in an amount of about 45 vol % to about 50 vol % based on total volume of the mixture.

44. The method of claim 33 wherein the Titania particles are present in the mixture in an amount of about 45 vol % based on total volume of the mixture.

45. The method of claim 42 wherein the organic binder is present in the mixture in an amount of about 3 wt. % to about 12 wt % based on total weight of the mixture.

46. The method of claim 42 wherein the organic binder is present in the mixture in an amount of about 4 wt. % to about 7 wt % based on total weight of the mixture.

47. The method of claim 42 wherein the organic binder is present in the mixture in an amount of about 5 wt. % based on total weight of the mixture.

48. The method of claim 45 wherein the liquid is present in the mixture in an amount of about 50 vol % to about 65 vol % based on total volume of the mixture.

49. The method of claim 45 wherein the liquid is present in the mixture in an amount of about 50 vol % to about 60 vol % based on total volume of the mixture.

50. The method of claim 45 wherein the liquid is present in the mixture in an amount of about 55 vol % based on total volume of the mixture.

51. The method of claim 1 wherein the mixture of reducing gases includes $CO/N_2$ and $CO_2/N_2$.

52. The method of claim 33 wherein the mixture of reducing gases includes $CO/N_2$ and $CO_2/N_2$.

53. The method of claim 1 wherein the mixture of reducing gases includes a first composition of 50% CO/50% $N_2$ and a second composition of 1% CO/99% $N_2$.

54. The method of claim 33 wherein the mixture of reducing gases includes a first composition of 50% CO/50% $N_2$ and a second composition of 1% CO/99% $N_2$.

55. The method of claim 51 wherein the mixture of reducing gases flows at a rate of about 100 SCCM to about 1000 SCCM.

56. The method of claim 52 wherein the mixture of reducing gases flows at a rate of about 100 SCCM to about 1000 SCCM.

57. The method of claim 1 wherein the fibers are heated at about 1° C./min. to about 10° C./min. to a firing temperature of about 1050° C. to about 1300° C., held at the firing temperature for about 8 hr to about 16 hrs, cooled at a rate of about 20° C./min. to about 50° C./min. to an intermediate temperature of about 600° C. to about 800° C., and then cooled to room temperature.

58. The method of claim 33 wherein the fibers are heated at about 1° C./min. to about 10° C./min. to a firing temperature of about 1050° C. to about 1300° C., held at the firing temperature for about 8 hr. to about 16 hrs, cooled at a rate of about 20° C./min. to about 50° C./min. to an intermediate temperature of about 600° C. to about 800° C., and then cooled to room temperature.

59. A method of manufacture of $Ti_4O_7$ conductive refractory fibers comprising,
reacting an amount of titanium (IV) isopropoxide with an amount of HCl to produce a sol comprising titania and a liquid component, wherein the titanium (IV) isopropoxide is present in an amount that is about five times the amount of HCl,
evaporating the liquid component of the sol to produce a Titania gel
extruding the gel to produce a green fiber comprising titania,
drying the green fiber to produce a dried fiber comprising titania, and
firing the dried fiber in a mixture of flowing reducing gases to produce a conductive, refractory fiber that comprises $Ti_4O_7$.

60. The method of claim 59 wherein the HCl has a temperature of about 0° C.

61. The method of claim 59 wherein the flowing reducing gases include a first composition of 50% CO/50% $N_2$ and a second composition of 1% CO/99% $N_2$.

62. The method of claim 59 wherein the firing of the dried fibers comprises heating the dried fibers at 10° C./min up to 1067° C., holding the fibers at 1067° C. for 12 hours and cooling to room temperature at 20° C./minute.

63. A method of manufacture of conductive refractory fibers comprising,
forming a mixture comprising Titania particles which have an average particle size of 320 microns, polyethylene imine and distilled water,
extruding the mixture to produce a green fiber comprising titania,
drying the green fiber to produce a dried fiber comprising titania, and
firing the dried fiber in flowing reducing gases to produce a conductive, refractory fiber comprising $Ti_4O_7$.

64. The method of claim 63 wherein the Titania particles, polyethylene imine and distilled water are present in a ratio of Titania: polyethylene imine: water about 40:1:19.

65. The method of claim 63 wherein the mixture is extruded at an initial rate of about 50 cm/sec and then at a continuous rate of about 10 cm/sec.

66. The method of claim 63 wherein the flowing reducing gases include a first composition of 50% CO/50% $N_2$ and a second composition of 1% CO/99% $N_2$.

67. The method of claim 63 wherein the firing of the dried fibers comprises heating the dried fibers at 10° C./min up to 1067° C., holding the fibers at 1067° C. for 12 hours and cooling to room temperature at 20° C./minute.

68. A method of manufacture of conductive refractory fibers comprising,
forming a mixture comprising Titania particles which have an average particle size of 50 nanometer, polyethylene imine, and distilled water,
extruding the mixture to produce a green fiber comprising titania,
drying the green fiber to produce a dried fiber comprising titania, and
firing the dried fiber in a reducing atmosphere to produce a conductive, refractory fiber comprising $Ti_4O_7$.

69. The method of claim 68 wherein the Titania particles, polyethylene imine and distilled water are present in a ratio of Titania: polyethylene imine: water of about 20:1:6.1.

70. The method of claim 68 wherein the mixture is extruded at an initial rate of about 50 cm/sec and then at a continuous rate of about 10 cm/sec.

71. The method of claim 70 wherein the flowing reducing gases include a first composition of 50% CO/50% $N_2$ and a second composition of 1% CO/99% $N_2$.

72. The method of claim 70 wherein the firing of the dried fibers comprises heating the dried fibers at 10° C./min up to 1067° C., holding the fibers at 1067° C. for 12 hours and cooling to room temperature at 20° C./minute.

* * * * *